United States Patent
Fedorov

(10) Patent No.: US 12,470,396 B2
(45) Date of Patent: Nov. 11, 2025

(54) ROLLBACK PROTECTION WITH EPHEMERAL IDENTITIES FOR TEE-BASED CONSENSUS PROTOCOLS

(71) Applicant: NEC Laboratories Europe GmbH, Heidelberg (DE)

(72) Inventor: Sergey Fedorov, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 18/032,365

(22) PCT Filed: Nov. 23, 2020

(86) PCT No.: PCT/EP2020/083064
§ 371 (c)(1),
(2) Date: Apr. 18, 2023

(87) PCT Pub. No.: WO2022/089768
PCT Pub. Date: May 5, 2022

(65) Prior Publication Data
US 2023/0412390 A1 Dec. 21, 2023

(30) Foreign Application Priority Data
Oct. 27, 2020 (EP) .................................. 20204005

(51) Int. Cl.
*H04L 9/32* (2006.01)
(52) U.S. Cl.
CPC ................. *H04L 9/3239* (2013.01)
(58) Field of Classification Search
None
See application file for complete search history.

(56) References Cited

U.S. PATENT DOCUMENTS

2010/0318786 A1* 12/2010 Douceur ............... H04L 63/123
 713/155
2020/0004643 A1* 1/2020 Yang .................. G06F 11/1438
(Continued)

FOREIGN PATENT DOCUMENTS

EP 3333747 A1 6/2018

OTHER PUBLICATIONS

Xu, Wenbo et al.; "RATCHETA: Memory-bounded Hybrid Byzantine Consensus for Cooperative Embedded Systems"; *2018 IEEE 37th International Symposium on Reliable Distributed Systems (SRDS)*; Oct. 2, 2018; pp. 103-112; XP033502228; IEEE; Piscataway, NJ, USA.

*Primary Examiner* — Cai Y Chen
(74) *Attorney, Agent, or Firm* — Leydig, Voit & Mayer, Ltd.

(57) ABSTRACT

A rollback protection method for preventing message equivocation in a consensus system is provided. The consensus system includes distributed computational nodes connected by a network and configured to run a TEE-based consensus protocol. The method includes: executing, within a trusted execution environment of a node of distributed computational nodes, a trusted component instance, that includes volatile protected memory with protected data stored therein and a protected piece of code implementing at least a part of a consensus algorithm, generating identity data comprising a unique ephemeral identity, and storing the identity data in the volatile protected memory of the trusted component instance, and certifying a message of the consensus algorithm, wherein a certified consensus algorithm message is generated by cryptographically binding parts of the consensus algorithm message to the unique ephemeral identity of the trusted component instance and at least parts of the protected data of the trusted component instance.

13 Claims, 4 Drawing Sheets

(56) References Cited

U.S. PATENT DOCUMENTS

2022/0078021 A1\* 3/2022 Monnier ............... H04L 9/3239
2022/0224518 A1\* 7/2022 Sarkar .................... G06F 21/64

\* cited by examiner

```
01.  upon initialization in trusted component instance
02.      identityData := generateNewIdentityData()
03.  procedure getIdentity()
04.      return extractIdentity(identityData)
05.  procedure certifyMessage(m)
06.      return procudeTEECertificate(m, identityData)
```

Fig. 3

```
01.  upon initialization in node i
02.      tee := createTrustedComponentInstance()
03.      teeId ← tee.getIdentity()
04.      m = ⟨TEE-IDENTITY, i, teeId⟩
05.      if restarting then submit m for consensus
06.      else for each node j send m to node j 07.  upon reception of m = ⟨TEE-IDENTITY, i, teeId⟩ from node j
08.      if ∃⟨TEE-IDENTITY, i, -⟩_j ∈ M then return
09.      M := M ∪ {⟨TEE-IDENTITY, i, teeId⟩_j}
10.      if j = i then for each node k ≠ i send m to k 11.  once ∃⟨TEE-IDENTITY, i, teeId⟩_j ∈ M for each node j
12.      A := A ∪ {⟨i, teeId⟩}

13.  upon consensus accepting ⟨TEE-IDENTITY, i, teeId⟩
14.      A := A \ {⟨i, -⟩}
15.      A := A ∪ {⟨i, teeId⟩}

16.  procedure certifyMessage(m)
17.      return tee.certifyMessage(m)

18.  procedure verifyCertifiedMessage(m, σ_i)
19.      wait until ∃⟨i, teeId⟩ ∈ A
20.      return verifyTEECertificate(m, σ_i, teeId)
```

Fig. 4

ROLLBACK PROTECTION WITH EPHEMERAL IDENTITIES FOR TEE-BASED CONSENSUS PROTOCOLS

CROSS REFERENCE TO RELATED APPLICATIONS

This application is a U.S. National Phase application under 35 U.S.C. § 371 of International Application No. PCT/EP2020/083064, filed on Nov. 23, 2020, and claims benefit to European Patent Application No. EP 20204005.1, filed on Oct. 27, 2020. The International Application was published in English on May 5, 2022 as WO 2022/089768 A1 under PCT Article 21(2).

FIELD

The present invention generally relates to distributed ledger technologies implementing consensus protocols. In particular, the invention relates to a rollback protection method for preventing message equivocation in a consensus system including a number of distributed computational nodes connected by a data communication network and configured to run a TEE-based consensus protocol. Furthermore, the present invention relates to a node in a network configured to run a consensus algorithm to reach consensus with a number of other nodes connected by the network, as well as to a consensus system with a rollback protection mechanism.

BACKGROUND

Permissioned distributed ledger technologies have recently attracted great attention due to their applications in wide range of industrial use cases. At its core, a distributed ledger system relies on a notion of agreement, or consensus, to ensure consistency of the replicated data. For that purpose, Byzantine fault-tolerant (BFT) voting-based consensus protocols provide desirable properties in terms of resilience and finality of agreement. However, such protocols suffer from high communication and computational overhead.

Motivated by this drawback, new BFT consensus protocols have been devised that aim at achieving high scalability and performance in practical deployments. One of the ways to achieve significant improvements in terms of scalability and performance of BFT consensus is by employing a trusted component. For example, MinBFT protocols (described in G. S. Veronese, M. Correia, A. N. Bessani, L. C. Lung and P. Verissimo, "Efficient Byzantine Fault-Tolerance", in IEEE Transactions on Computers, 2013, the entire disclosure of which is hereby incorporated by reference herein) and FastBFT protocols (described in J. Liu, W. Li, G. O. Karame and N. Asokan, "Scalable Byzantine Consensus via Hardware-Assisted Secret Sharing", in IEEE Transactions on Computers, 2019, the entire disclosure of which is hereby incorporated by reference herein) employ trusted components to prevent faulty nodes from message equivocation, i.e. sending conflicting messages to different nodes. Message equivocation is prevented in MinBFT and FastBFT protocols by assigning sequential, monotonically increasing trusted counter values to certified messages. Thanks to efficient hardware security mechanisms in form of trusted execution environments (TEE), which become widely available on modern commodity computing platforms, such consensus protocols look especially attractive for practical deployments.

However, to prevent message equivocation, such consensus protocols require rollback protection for at least parts of the trusted component state. In addition to that, correct nodes must agree on identities of the trusted component instances of all participating nodes. Correct nodes should only accept certain messages generated by another node if they are certified by the trusted component instance of the remote node that ensures rollback protection and is known under the same identity by all other correct nodes.

The aforementioned requirements can be satisfied by relying on a hardware monotonic counter provided by the TEE platform. Unfortunately, hardware monotonic counters rely on non-volatile memory which is a very limited resource. For example, the TEE platform most commonly implemented today, which is INTEL Software Guard Extensions (SGX), only supports hardware monotonic counters as an optional feature. Furthermore, in order to control wearing out of the non-volatile memory, the SGX platform imposes a quota on the number of monotonic counters that can be created and limits the rate at which monotonic counter operations can be performed. Due to those limitations, hardware monotonic counters should be considered of limited availability, especially in could computing environments.

One option to achieve rollback protection without using hardware monotonic counters is to rely on a trusted third-party service. The third-party service can act as a rollback-resistant persistent storage to keep record of the identities of the trusted component instances of the participating nodes. Combined with using volatile memory of trusted component instances that is protected for integrity by TEE, this could constitute an efficient solution of the problem. Obviously, this adds an extra dependency on the third-party service. Moreover, reliance on a trusted third-party service may be unacceptable in many practical use cases, such as running BFT consensus system among independent, mutually mistrusted stakeholders.

Another attempt to overcome the limitations of hardware monotonic counters was proposed in a rollback protection system named ROTE (described in S. Matetic, M. Ahmed, K. Kostiainen, A. Dhar, D. Sommer, A. Gervais, A. Juels and S. Capkun, "ROTE: Rollback Protection for Trusted Execution", in 26th USENIX Security Symposium, the entire disclosure of which is hereby incorporated by reference herein). Instead of relying on hardware monotonic counters based on local non-volatile memory, ROTE achieves rollback protection as a distributed system. Since a consensus system is itself a distributed system, ROTE may seem an attractive solution to achieve rollback protection for TEE-based consensus protocols. Nevertheless, ROTE requires a centralized trusted authority to perform system initialization. This requirement may remain unacceptable in many practical use cases.

SUMMARY

In an embodiment, the present disclosure provides a rollback protection method for preventing message equivocation in a consensus system, wherein the consensus system comprises a number of distributed computational nodes connected by a data communication network and configured to run a TEE (within a trusted execution environment)-based consensus protocol, the method comprising: executing a TEE of a first node of the number of distributed computational nodes, a trusted component instance, wherein the trusted component instance comprises volatile protected memory with protected data stored therein and a protected piece of code implementing at least a part of a consensus algorithm; generating, by the trusted component instance, identity data comprising a unique ephemeral identity, and storing the identity data in the volatile protected memory of the trusted component instance; and certifying, by the trusted component instance, a message of the consensus algorithm, wherein a certified consensus algorithm message is generated by cryptographically binding at least parts of the consensus algorithm message to the unique ephemeral identity of the trusted component instance and at least parts of the protected data of the trusted component instance

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 illustrates a pseudo-code representation of method steps executed in a trusted component instance of a node of a TEE-based consensus system in accordance with an embodiment of the present invention; and FIG. 4 illustrates a pseudo-code representation of method steps executed by each of the nodes of a TEE-based consensus system in accordance with an embodiment of the present invention.

DETAILED DESCRIPTION

Figure 1:
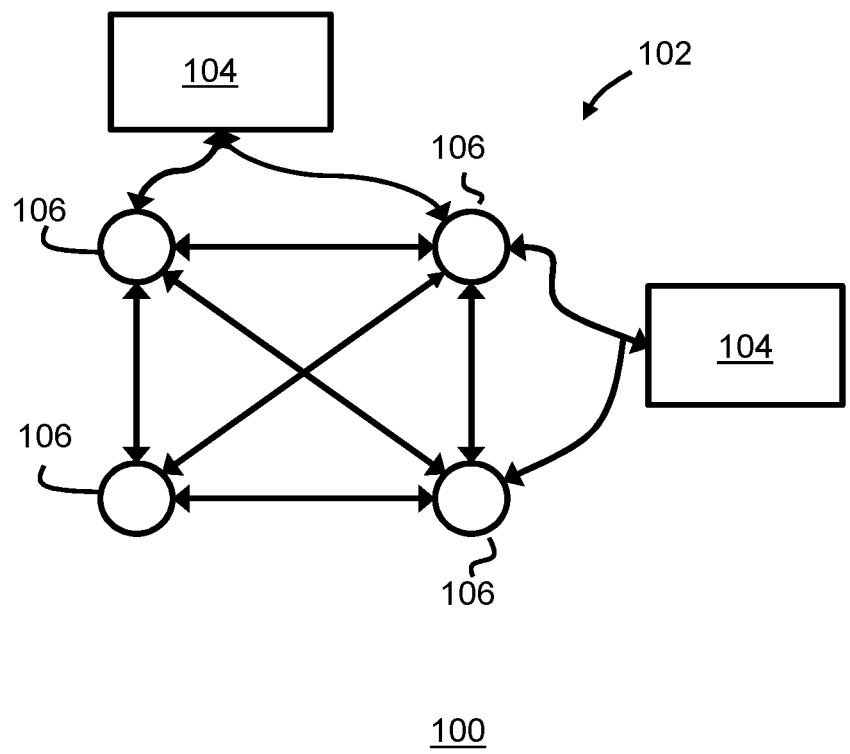
FIG. 1 illustrates an exemplary embodiment of a blockchain system.

In an embodiment, the present invention improves and further develops a consensus method and system as well as a node configured to run a consensus algorithm of the initially described type in such a way that rollback protection is achieved without relying on hardware monotonic counters or trusted third-party services.

In accordance with another embodiment, the present invention provides a rollback protection method for preventing message equivocation in a consensus system including a number of distributed computational nodes connected by a data communication network and configured to run a TEE-based consensus protocol, the method comprising executing, within a trusted execution environment, TEE, of a node a trusted component instance, wherein the trusted component instance includes volatile protected memory with protected data stored therein and a protected piece of code implementing at least a part of the consensus algorithm; generating, by the trusted component instance, identity data including a unique ephemeral identity and storing the identity data in the volatile protected memory of the trusted component instance; and certifying, by the trusted component instance, a message of the consensus algorithm, wherein a certified consensus algorithm message is generated by cryptographically binding at least parts of the consensus algorithm message to the unique ephemeral identity of the trusted component instance and at least parts of the trusted component instance's protected data.

In another embodiment, the present invention provides a node in a network configured to run a consensus algorithm to reach consensus with a number of other nodes connected by the network, the node comprising one or more processors which, alone or in combination, are configured to provide for performance of the following steps: executing, within a trusted execution environment, TEE, of the node a trusted component instance, wherein the trusted component instance includes volatile protected memory with protected data stored therein and a protected piece of code implementing at least a part of the consensus algorithm; generating, by the trusted component instance, identity data including a unique ephemeral identity and storing the identity data in the volatile protected memory of the trusted component instance; certifying, by the trusted component instance, a message of the consensus algorithm, wherein a certified consensus algorithm message is generated by cryptographically binding at least parts of the consensus algorithm message to the unique ephemeral identity of the trusted component instance and at least parts of the trusted component instance's protected data.

In another embodiment, the present invention provides a consensus system with a rollback protection mechanism for preventing message equivocation, the system comprising a number of distributed computational nodes connected by a data communication network, each of the computational nodes being configured according to the above specification.

Embodiments of the invention describe methods and systems to achieve rollback protection in a TEE-based consensus system without relying on hardware monotonic counters or trusted third-party services. Exemplary embodiments of the invention enable nodes of a TEE-based consensus system to ensure rollback protection sufficient for preventing equivocation of messages of the consensus algorithm. To this end, embodiments of the invention provide for a certification of consensus algorithm messages by the trusted component instance of each node, without relying on hardware monotonic counters of trusted third-party services. According to embodiments, rollback protection for preventing message equivocation in TEE-based consensus system is based on dynamically creating new ephemeral identities for trusted component instances upon every restart. The rollback protection may be achieved through reaching unanimous agreement on these ephemeral identities of the trusted component instances during bootstrapping and utilizing the running consensus for agreeing of identity updates.

In an embodiment, the nodes participating in the consensus system may utilize Intel SGX as a trusted execution environment to execute a trusted component of a consensus algorithm, where Intel SGX enclaves may represent trusted component instances.

In an embodiment, a trusted component instance may randomly generate and store in its volatile protected memory a unique ephemeral identity data as a binary numeral value, which also represents a unique identity of the trusted component instance. The trusted component instance may be configured to bind a certified message with its ephemeral identity by producing a digital signature over at least parts of the certified message and at least the unique ephemeral identity data stored in its protected volatile memory.

In another embodiment, a trusted component instance may generate and store in its volatile protected memory a unique ephemeral identity data as a new cryptographic key pair, where the public key represents a unique identity of the trusted component. The trusted component instance may bind a certified message payload with its ephemeral identity by using the secret key in the unique ephemeral identity data stored in its protected volatile memory to produce a digital signature over at least parts of the certified message.

In an embodiment, the nodes may be configured to execute MinBFT as a consensus protocol. In this case, the trusted component instance of each node may maintain a monotonic counter value in its volatile protected memory. This monotonic volatile (software) counter value may be incremented and included in a signed payload of the digital signature produced when certifying the binding of a certified consensus protocol message with the ephemeral identity of the trusted component. As such, in the above case, the digital signature payload consists of at least parts of the message and the counter value.

In another embodiment, the nodes may be configured to execute FastBFT as a consensus protocol. In this case, the trusted component instance of each node may maintain a pair of monotonic counter and view number values in its volatile protected memory. The monotonic volatile (software) counter value may be incremented and the pair of counter and view number values may be included in the signed payload of the digital signature produced when certifying the binding of a certified message with the ephemeral identity of the trusted component. As such, in the above case, the digital signature payload consists of at least parts of the message and the pair of counter and view number values. The counter value may be reset to the initial value on each increment of the view number value.

The term "certifying the binding" as used above should be understood in the sense of producing a certificate, such as a digital signature, that confirms the binding. In other words, a message certificate is generated, wherein the main purpose of the message certificate is to confirm the binding of the message to the ephemeral identity of the trusted component and at least parts of the trusted component instance's protected data, e.g. counter value. Depending on the embodiment chosen (e.g., if unique ephemeral identity data is a random binary numeral value), the digital signature payload may also have to include the ephemeral identity. On the other hand, if the ephemeral identity is, e.g. a public key or public certificate, there is no need to include it in the digital signature payload, as the binding in such case is verifiably confirmed implicitly by using the corresponding private key to produce the signature. As will be appreciated by those skilled in the art, the digital signature payload may also contain further data, such as the trusted component instance's configuration parameters, depending on the implementation.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

Embodiments of the present invention relate to a mechanism for a number of distributed computational nodes, connected by a data communication network and configured to run a TEE-based consensus protocol, to achieve rollback protection of at least a part of the nodes' trusted component state.

The nodes are supposed to execute a common piece of algorithm, called consensus algorithm. For the purpose of the present disclosure, the described rollback protection method is considered a part of the consensus algorithm. The nodes correctly executing the consensus algorithm are called correct nodes. The remaining nodes are called faulty nodes. The number of faulty nodes is assumed to have a known upper bound.

The consensus algorithm, after being initialized, allows correct nodes to reach an agreement on a proposal such that all correct nodes eventually accept the same proposal. The proposal refers, or is bound, to a proposal payload. In one possible embodiment, the payload represents a sequence of transactions to be added to a distributed ledger. In another possible embodiment, the payload represents a sequence of operations to be performed by a replicated state machine.

The nodes are provided with a trusted execution environment (TEE). Here, we define TEE as an isolated computational environment, together with strictly defined mechanisms to interact with it. TEE provides a certain level of guarantee for correct execution of the code running within preserving its integrity as well as integrity and confidentiality of the protected data processed by the code. In different embodiments, depending on the desired level of isolation, TEE can be provided by a dedicated hardware device (e.g. Trusted Platform Module), CPU feature (e.g. Intel® SGX or ARM TrustZone), virtualization technology (e.g. XEN or KVM), OS kernel (e.g. Linux Containers or OS processes), or even purely in application software (e.g. using secure modular programming techniques).

FIG. 1 illustrates a blockchain system 100 as an exemplary distributed ledger system, in which rollback protection mechanisms in accordance with embodiments of the present invention can be implemented. The blockchain system 100 comprises several blockchain nodes in communication with each other to form the blockchain network 102. According to the implementation shown in FIG. 1, the blockchain network 102 includes users 104, which issue signed transactions (e.g., transactions to exchange digital currency) that are sent on to the blockchain network 102. Furthermore, the blockchain network 102 includes a number of validator nodes 106 (a.k.a. "miners"), which form a consensus system by running a consensus protocol to achieve consensus on transactions issued by users 104. Once having achieved consensus on a certain transaction, the validator nodes 106 confirm the transaction by producing a block that contains the transaction and by adding the block to the blockchain. In the blockchain system 100, validator nodes 106 are implemented with mining devices (e.g., computers) having a trusted execution environment (TEE), such as Intel SGX.

Figure 2:
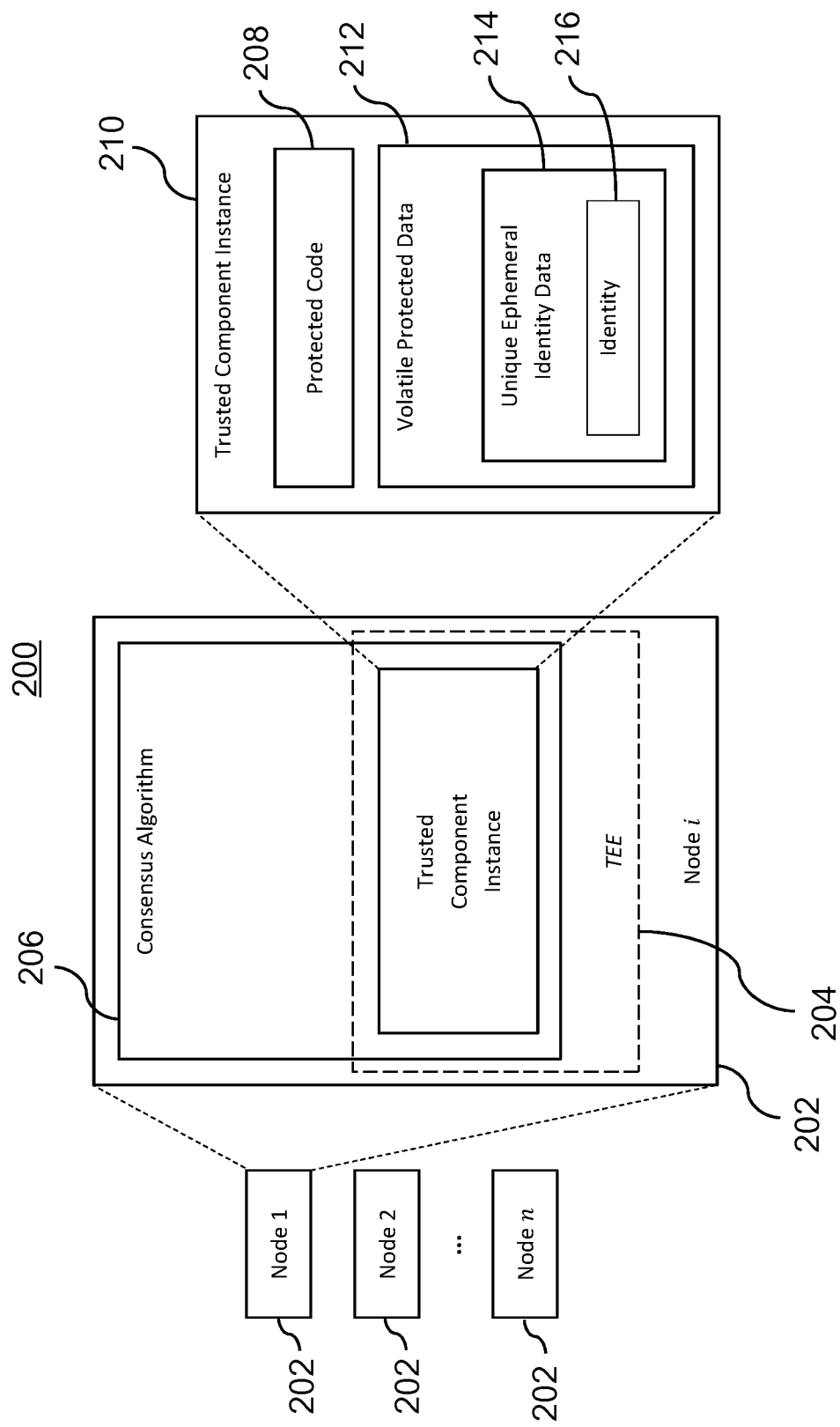
FIG. 2 illustrates an exemplary embodiment of a node of a TEE-based consensus system in accordance with an embodiment of the present invention.

FIG. 2 schematically illustrates an exemplary consensus system 200 in accordance with an embodiment of the present invention. The consensus system 200 includes a number of n distributed nodes 202 (Node 1, . . . , Node n) connected with each other by a data communication network (not shown). In an embodiment, the nodes 202 may be the validator nodes 106 of the blockchain network of FIG. 1. Exemplarily, the configuration of Node 1 is shown in greater detail in FIG. 2. However, the configuration of the remaining nodes 202 participating in the consensus system 200 is assumed to be identical to the configuration of Node 1.

As already mentioned above, the nodes 202 are provided with a trusted execution environment (TEE) 204, wherein at least parts of the code implementing the consensus algorithm 206 runs within the TEE 204. In the context of the present disclosure, a piece of code 208 implementing a part of the consensus algorithm 206 that is protected by the TEE 204 is referred to as a trusted component of the consensus algorithm 206. It is assumed possible executing multiple isolated instances 210 of the trusted component on the same node 202. One such trusted component instance 210 is shown in greater detail in FIG. 2. Each of such trusted component instances 210 will execute the same code but process a separate, isolated piece of protected data stored in a volatile protected memory 212. The TEE 204 preserves integrity and confidentiality of protected data belonging to each of the trusted component instances 210 so that only a single instance 210 of a trusted component can effectively access its own protected memory 212.

The integrity of the protected data belonging to a trusted component instance 210 implies rollback resistance of the protected data in the sense that the instance's 210 protected memory 212 is guaranteed to be accessed and modified during the life time of the trusted component instance 210 strictly according to the logic implemented by the trusted component code 208. This rollback protection alone is, however, not sufficient to prevent message equivocation in the consensus protocol since a faulty node can create multiple identical instances of the trusted component and use them to certify conflicting messages. Therefore, in accordance with embodiments of the present invention it has been recognizes the need for that a stronger rollback protection.

With additional reference to FIGS. 3 and 4, embodiments of the present invention will be described hereinafter, which allow to achieve sufficient rollback protection for a TEE-based consensus system 200 to prevent message equivocation. While the pseudocode depicted in FIG. 3 refers to those actions executed within each node's 202 trusted component, the pseudocode depicted in FIG. 4 relates to the interaction among all of the nodes 202 that participate in the consensus protocol.

According to an embodiment, each node's 202 trusted component instance 210 may be configured to generate a unique ephemeral identity data 214 and to store it in its volatile protected memory 212 upon initialization. This action is specified in lines 01-02 of the pseudocode of FIG. 3. The identity data 214 includes a unique identity 216 that the node 202 can retrieve from its trusted component instance 210 and that can be used to identify the trusted component instance 210. This action is specified in lines 03-04 of the pseudocode of FIG. 3. For instance, the unique identity 216 may be randomly generated as a binary numeral value.

As specified in lines 01-03 of FIG. 3, each node 202 is configured to retrieve the unique ephemeral identity 216 generated as described above from its own trusted component instance 210 and to send it to each of the other nodes 202 participating in the consensus protocol.

In addition, it may be provided that a node 202 forwards an identity 216 that it received from a particular node 202 to all of the remaining nodes 202, as specified in line 10 of FIG. 4. Finally, a node 202 may accept an identity 216 in case it received matching identities from all other nodes 202, as specified in lines 11-12 of FIG. 4.

The steps described so far ensure that the trusted component instance 210 of each node 202 will be known under the same identity by all other correct nodes 202 after a system start.

According to embodiments of the invention, each node 202 may be configured to utilize its trusted component instance 210 to certify certain messages of the consensus algorithm 206. In this context, it may be provided that the trusted component instance 210 generates a certified consensus algorithm message in such a way that at least parts of the certified consensus algorithm message are cryptographically bound to the ephemeral identity 216 of the trusted component instance 210. Exemplarily, this is specified in lines 05-06 of pseudocode of FIG. 3.

Based on such certifications of consensus algorithm messages by the nodes' 202 trusted component instances 210, each node 202 may verify a certified consensus algorithm message of another node 202 against the corresponding accepted identity of that node 202, as specified in lines 18-20 of FIG. 4. In this context it is important to note that the integration of a node's 202 unique ephemeral identity 216 into the process of certifying certain messages of the consensus algorithm 206 implies rollback resistance of the protected data. However, as will be appreciated by those skilled in the art and as mentioned already above, including just the ephemeral identity form the trusted component's 210 volatile protected memory 212 is most likely not sufficient to achieve rollback protection that would also guarantee the prevention of message equivocation. Therefore, according to embodiments of the invention, it may be provided to cover at least some other parts of trusted component's 210 volatile memory 212 by the certificate, such as a (software) counter value.

According to embodiments of the invention, in order to enable restarting nodes 202 to rejoin the consensus system 200, without compromising the rollback protection capacity of the consensus system, it may be provided that in case of a node restart, the restarting node 202 is configured to create and initialize a new instance 210 of the trusted component as specified in lines 01-02 of FIG. 4. It should be noted that the process of creating and initializing the trusted component instance 210 may be carried out in exactly the same way as at the time of the initial system start, as described above, i.e. upon initialization the new trusted component instance 210 also generates a new identity 216.

The restarting node 202 may then retrieve the new identity 216 from its trusted component instance 210 and may submit the identity update as a proposal through the consensus protocol run by the other nodes 202, as specified in line 05 of FIG. 4. As specified in lines 13-15, it may be provided that each node 202 accepts the new trusted component identity 216 of the restarted node 202 once consensus on the submitted proposal is reached. This mechanism ensures that a restarted node 202 can securely rejoin the consensus system 200 with a new instance 210 of the trusted component.

As already mentioned above, embodiments of the present invention achieve rollback protection to prevent message equivocation in a TEE-based consensus system, both during bootstrapping of the system as well as in case of node restarts. According to an embodiment, the following steps may be executed during bootstrapping of the consensus system:

Each node's trusted component instance generates a unique ephemeral identity data, including a unique identity, and stores it in its volatile protected memory upon initialization.

Each node retrieves the identity generated in the previous step from its own trusted component instance and sends it to each other node.

Each node further sends the identities sent to it by other nodes in the previous step to the remaining nodes.

Each node accepts an identity upon reception, from all other replicas, of a matching identity sent in the previous steps.

Each node utilizes its trusted component instance to certify certain consensus messages by cryptographically binding at least parts of the certified message with the ephemeral identity of the trusted component and at least parts of the trusted component's protected data.

Each node verifies messages certified with a trusted component instance of another node against the corresponding accepted identity.

In case of a node restart, the following rejoining steps may be executed:

The restarting node creates and initializes a new instance of the trusted component.

The restarting node retrieves the new identity generated by the trusted component instance created in the previous step and submits the identity update as a proposal through the consensus protocol running by other nodes.

Each node accepts the new trusted component identity of the restarted node once consensus is reached on the proposal submitted in the previous step.

As will be appreciated by those skilled in the art, faulty nodes can prevent the consensus system as described herein from reaching unanimous agreement during bootstrapping. In that case, it may be provided that bootstrapping is repeated after identifying the faulty nodes and excluding them from the system. Nevertheless, the node owners are expected to have strong incentives to successfully initiate the consensus protocol.

In contrast to existing prior art methods, embodiments of the present invention remove the dependency on hardware monotonic counters or trusted third-party services, which is advantageous in many practical use cases, such as running the consensus system by mutually mistrusted stakeholders in a cloud environment. As such, embodiments of the invention prove to be particularly suitable for industrial distributed ledger solutions in many industrial use-cases. Exemplary embodiments of the invention may be implemented by utilizing FastBFT as consensus protocol and may be integrated into a Hyperledger Fabric blockchain framework, for instance.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the exemplary embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rollback protection method for preventing message equivocation in a consensus system, wherein the consensus system comprises a number of distributed computational nodes connected by a data communication network and configured to run a trusted execution environment (TEE)-based consensus protocol, the method comprising:
   executing, within a TEE of a first node of the number of distributed computational nodes, a trusted component instance, wherein the trusted component instance comprises volatile protected memory with protected data stored therein and a protected piece of code implementing at least a part of a consensus algorithm;
   generating, by the trusted component instance, identity data comprising a unique ephemeral identity, and storing the identity data in the volatile protected memory of the trusted component instance;
   certifying, by the trusted component instance, a message of the consensus algorithm, wherein a certified consensus algorithm message is generated by cryptographically binding at least parts of the consensus algorithm message to the unique ephemeral identity of the trusted component instance and at least parts of the protected data of the trusted component instance;
   retrieving, by the first node, the unique ephemeral identity from the trusted component instance; and
   sending, by the first node, the retrieved unique ephemeral identity to each of the remaining nodes of the number of distributed computational nodes, wherein each of the remaining nodes is configured to forward the retrieved unique ephemeral identity received from the first node to each of the other remaining nodes such that the retrieved unique ephemeral identity is acceptable by one of the remaining nodes based on the unique ephemeral identities forwarded from each of the other remaining nodes matching according to the consensus protocol.

2. The method according to claim 1, further comprising:
   accepting, by the one of the remaining nodes, the retrieved unique ephemeral identity upon reception of the unique ephemeral identities forwarded from each of the other remaining nodes of the number of distributed computer nodes that are all determined to be matching according to the consensus protocol; and
   verifying, by the one of the remaining nodes, the certified consensus algorithm message received from the first node against the accepted unique ephemeral identity.

3. The method according to claim 1, further comprising:
   creating and initializing, during a node restart of the first node, a new instance of the trusted component; and
   retrieving, by the restarted first node, a new unique ephemeral identity from the volatile protected memory of the trusted component instance, and submitting the new unique ephemeral identity as a proposal of the consensus algorithm to each of the remaining nodes such that the new unique ephemeral identity is acceptable by each of the remaining nodes once consensus on the submitted proposal is reached.

4. The method according to claim 1, wherein the network is a blockchain network.

5. A node in a network configured to run a consensus algorithm to reach consensus with a number of other nodes connected by the network the node comprising one or more processors which, alone or in combination, are configured to:
- execute, within a trusted execution environment (TEE) of the node, a trusted component instance, wherein the trusted component instance comprises volatile protected memory with protected data stored therein and a protected piece of code implementing at least a part of the consensus algorithm;
- generate, by the trusted component instance, identity data comprising a unique ephemeral identity and storing the identity data in the volatile protected memory of the trusted component instance;
- certify, by the trusted component instance, a message of the consensus algorithm, wherein a certified consensus algorithm message is generated by cryptographically binding at least parts of the consensus algorithm message to the unique ephemeral identity of the trusted component instance and at least parts of the protected data of the trusted component instance;
- retrieving, by the first node, the unique ephemeral identity from the trusted component instance; and
- sending, by the first node, the retrieved unique ephemeral identity to each of the remaining nodes of the number of distributed computational nodes, wherein each of the remaining nodes is configured to forward the retrieved unique ephemeral identity received from the first node to each of the other remaining nodes such that the retrieved unique ephemeral identity is acceptable by one of the remaining nodes based on the unique ephemeral identities forwarded from each of the other remaining nodes matching according to the consensus protocol.

6. The node according to claim 5, wherein the trusted component instance is configured to randomly generate the unique ephemeral identity as a binary numeral value.

7. The node according to claim 5, wherein the trusted component instance is configured to generate the identity data as a new cryptographic key pair,
- wherein the public key represents the unique ephemeral identity of the trusted component instance, and
- wherein the secret key is used by the trusted component instance to produce a digital signature over at least parts of the certified consensus algorithm message.

8. The node according to claim 5, further configured to execute MinBFT as a consensus protocol,
wherein the node is further configured to:
- maintain a counter value in the trusted component instance's volatile protected memory; and
- increment the counter value and include the incremented counter value in a signed payload of the digital signature produced when certifying the binding of the certified consensus algorithm message with the unique ephemeral identity of the trusted component instance.

9. The node according to claim 5, further configured to execute FastBFT as a consensus protocol,
wherein the node is further configured to:
- maintain a pair of counter value and view number value in the trusted component instance's volatile protected memory;
- increment the counter value and to include the pair of incremented counter value and view number value in a signed payload of the digital signature produced when certifying the binding of the certified consensus algorithm message with the unique ephemeral identity of the trusted component instance; and
- reset the counter value to an initial value on each increment of the view number value.

10. The node according to claim 5, further configured to perform, during a restart of the node, the following steps:
- create and initialize a new instance of the trusted component;
- retrieve a new unique ephemeral identity generated by the trusted component instance; and
- submit the new unique ephemeral identity as a proposal of the consensus algorithm to each of the remaining nodes.

11. The node according to claim 5, wherein the TEE is provided by a dedicated hardware device, as a CPU feature, as OS kernel, by virtualization technology, or by application software.

12. The node according to claim 5, further configured to utilize Intel SGX as the TEE to execute the trusted component of the consensus algorithm, wherein an Intel SGX enclave represents the trusted component instance.

13. A consensus system with a rollback protection mechanism for preventing message equivocation, the system comprising a number of distributed computational nodes connected by a data communication network, each of the computational nodes being configured according to claim 5.

* * * * *